United States Patent Office 2,853,055
Patented Sept. 23, 1958

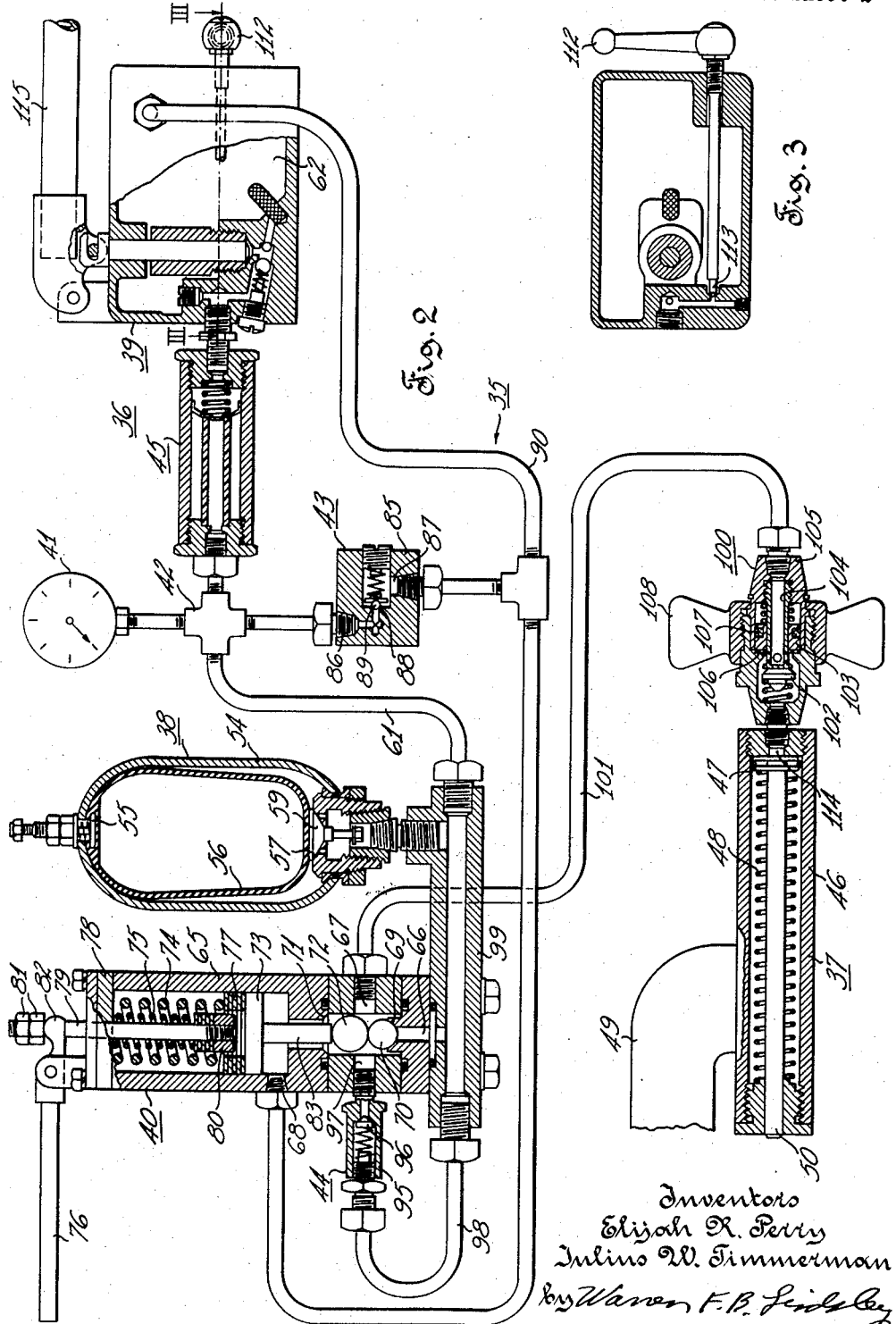

2,853,055

PORTABLE PNEUMOHYDRAULIC CLOSING MECHANISM FOR CIRCUIT BREAKERS

Elijah R. Perry, Stoughton, and Julius W. Timmerman, North Weymouth, Mass., assignors to Allis-Chalmers Manufacturing Company, Milwaukee, Wis.

Application January 31, 1955, Serial No. 485,268

4 Claims. (Cl. 121—38)

This invention relates to circuit breaker closing mechanisms and more particularly to a portable power closing device and parts thereof for closing a circuit breaker on an energized system.

When circuit breakers are closed on an energized power system they must be closed rapidly to reduce or eliminate excessively burning of the engaging contacts. For this reason, power circuit breakers are provided with a high speed contact closing mechanism which usually employs either a solenoid or compressed air means to supply the energy needed to rapidly close the engaging contacts.

It occasionally happens, however, that the source of electrical energy supplying the solenoid or the compressor of the compressed air means is temporarily lost as, for example, by the failure of a control power transformer. Also, there are other difficulties which, although insignificant in themselves, may prevent the use of the normal method of closing, a few examples of which are: burnout of a closing solenoid, control relay or rectifier and damage to a control switch or to control wiring. However, if a safe method of emergency closing is available, a consequent untimely and possibly costly interruption of service can be averted.

In most power service applications, a circuit breaker remains in either the closed or open position for relatively long periods of time, being called upon normally to perform a circuit closing operation only in conjunction with such circuit switching operations as are required for proper maintenance of power service. Hence, if the source of electrical energy for supplying the solenoid or compressor is temporarily lost, or the breaker closing means is otherwise incapacitated, at a time when such circuit switching operations are required, it may be necessary to close the circuit breaker manually.

However, ordinary manual closing devices of the prior art are capable of closing breakers, other than the very smallest, only at subnormal speeds, thereby incurring the risk of damage to the breaker contact structure by excessive arcing and even of serious injury to the person attempting to operate the device.

In order to provide means adequate for the circuit switching operations of a breaker whose normal closing means is incapacitated and at the same time eliminate the hazards of manually closing such a breaker, a new and improved pneumohydraulic emergency closing device has been provided which furnishes the instantaneous power required to close the circuit breakers at a speed equal to or greater than their normal closing speeds without jogging. This closing device, in accordance with the invention claimed, utilizes only a few component parts, namely a small manually operated hydraulic pump with built-in reservoir and bypass valve, an accumulator tank which utilizes a gas filled bladder under pressure for energy storage, a closing valve and hydraulic interlock combination which prevents the initiation of a closing stroke unless sufficient energy is available to complete the stroke at the required speed, a relief valve which opens to bypass hydraulic fluid back to the pump reservoir when maximum safe operating pressure is reached and a hydraulic operating fluid motor.

The fluid motor is connected to the breaker operating linkage by an easily detachable bracket. When the emergency closing device is to be used to close a circuit breaker, the fluid motor is attached to the breaker by means of the bracket. Then the hand pump is operated until full operating pressure is built up in the accumulator. A pressure gauge gives a visual indication of the pressure within the accumulator. Full operating pressure is built up in less than one minute. A spring biased valve prevents the releasing of oil from the accumulator to the fluid motor, unless there is adequate pressure to insure a successful closing operation.

After sufficient pressure has been built up, a closing stroke may be initiated by moving the operating lever on the device to the "close" position. The operating valve automatically goes to full open position as soon as it is released. Thus, the full operating pressure in the accumulator is instantly transmitted to the fluid motor. The piston of the motor transmits this energy to the breaker operating linkages to close the circuit breaker at its normal speed.

It is, therefore, one object of the present invention to provide a new and improved pneumohydraulic emergency power closing device for circuit breakers.

Another object of this invention is to provide a new and improved manual power closing device for circuit breakers which can close a circuit breaker's engaging contacts at a speed equal to or greater than the speed of the circuit breaker contact closing mechanism.

A further object of this invention is to provide a new and improved manual power closing device which eliminates the hazards of excessive burning of the engaging contacts during a circuit breaker closing operation.

A still further object of this invention is to provide a new and improved power closing device in which a source of fluid pressure of a predetermined value is manually created before a circuit breaker closing operation can occur.

A still further object of this invention is to provide a power closing device in which the fluid pressure cannot reach values high enough to damage a circuit breaker during a breaker closing operation.

A still further object of this invention is to provide a power closing device employing a valve which prevents the release of fluid under pressure unless there is adequate pressure to insure a successful circuit breaker closing operation.

A still further object of this invention is to provide a new and improved circuit breaker operating mechanism which when used with a given group of circuit breakers compensates automatically for their different loads so as to provide satisfactory circuit breaker closing speeds for all.

A still further object of this invention is to provide a single power closing device capable of closing circuit breakers having widely differing force and speed requirements.

Objects and advantages other than those set forth will be apparent from the following description when read in connection with the accompanying drawings, in which:

Fig. 2 is a schematic diagram of the manual power circuit breaker closing device shown in Fig. 1; and Fig. 3 is a cross sectional view through the reservoir of the pump structure of Fig. 2 taken along the line III—III.

Figure 1:
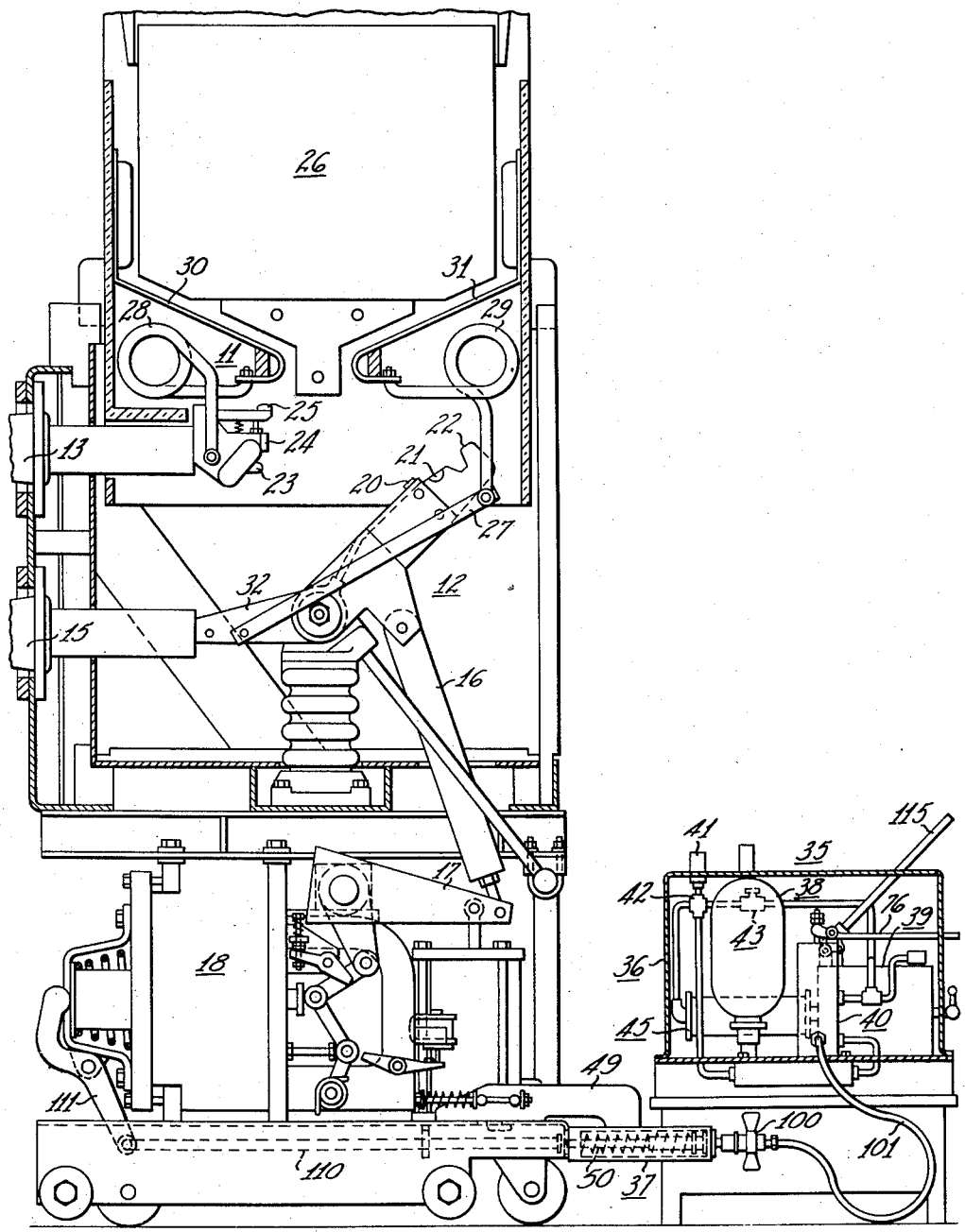
Fig. 1 is a view in vertical cross section of a magnetic blowout type circuit breaker employing the present invention.

Referring more particularly to the drawings by characters of reference, Fig. 1 illustrates a magnetic blowout type of circuit breaker employing an arc chute of any suitable form into which the arc is forced by the magnetic blowout field and extinguished. The power circuit to be interrupted includes relatively movable contacts between which the arc is formed when the contacts separate at the entrance to the arc chute. Specifically, the contacts comprise a fixed contact structure 11 and coacting movable contact structure 12. The fixed contact structure is electrically connected to a lead-in conductor stud 13 defining one terminal of the breaker, and the movable contact structure 12 comprises a pivoted switch arm having an arcing contact mounted at one end thereof and electrically connected to a conductor stud 15 defining the other breaker terminal. The pivoted contact structure 12 is suitably operated between open and closed circuit position by an operating rod 16 that is connected through a crank 17 to a solenoid or other operating means 18.

Fig. 1 illustrates the movable contact structure 12 in contact open position, the coacting main and arcing contacts 20 and 22, respectively, of the movable contact structure 12 being spaced apart from corresponding main and arcing contacts 23 and 25, respectively, of the fixed contact structure 11. A pair of lugs 21 (one of which is shown in Fig. 1) are integrated with arcing contact 22 and extend from opposite sides of a web portion of arcing contact 22. Lugs 21 together with the web portion of the arcing contact 22 form an engaging surface which coacts with that of a loose fitting, self-aligning block of insulating material 24 on the stationary contact structure 11 to limit overtravel of the movable contact structure 12 in the closing direction. In breaker closed position the stationary arcing contact 25 is shunted by stationary main contact 23. Opening of the breaker by the clockwise rotation of the breaker movable contact structure 12 causes in the sequence named separation of the main current carrying contacts 20, 23 and the arcing contacts 22, 25. The power arc is formed at the entrance of an arc chute 26 of any suitable known type.

Arc chute 26 is illustrated as being provided with magnetic blowout means comprising blowout coils 28 and 29 arranged so as to cause the arc formed between the contacts 22 and 25 to be blown by the magnetic field into arc chute 26. Blowout coil 28 is connected at one end thereof to an arc runner 30 and at the other end thereof immediately adjacent main contact 23. Blowout coil 29 is connected at one end thereof to an arc runner 31 and at the other end thereof to a lower terminal extension 32 through a conductive bar 27.

Upon separation of the arcing contacts 22 and 25 in a circuit interrupting action the arc terminal is transferred from stationary arcing contact 25 to arc runner 30, thereby inserting blowout coil 28 in the arcing circuit traced from the point of connection of blowout coil 28 on the upper terminal block immediately adjacent main contact 23 through blowout coil 28 to arc runner 30, through the arc to movable arcing contact 22. As the arc, now established between arc runner 30 and the movable arcing contact 22, is attenuated by the clockwise rotation of contact structure 12, the arc envelops the lowermost portion of arc runner 31 thereby transferring the arc terminal from arcing contact 22 to arc runner 31 and inserting blowout coil 29 in the arcing circuit. The arcing circuit is now completed through the bar 27 which connects the blowout coil 29 with the lower terminal extension 32.

In accordance with the invention claimed, a new and improved manual power closing device 35 is attached to the circuit breaker structures for closing breakers on an energized system. This portable unit provides sufficient power to close the circuit breaker contact structures 11, 12 at a proper speed and to insure proper operation of the contacts against the mechanical forces produced by short circuit currents which might exist at the instant of closing.

This portable manual power closing device 35 is a completely self-contained unit requiring no outside source of power for operation and comprises two main parts, namely, the power unit 36 and the fluid motor operating means 37. The power unit 36 comprises a stored energy device referred to herein as an accumulator 38, a hand pump 39, a control valve 40, a pressure gauge 41, associated fitting 42, valves 43 and 44 and filter 45. The fluid motor operating means 37, as more clearly shown in Fig. 2, comprises cylinder 46, piston 47 reciprocably mounted in cylinder 46 and biased in one direction by a spring 48, a circuit breaker structure engaging arm 49 for attaching the fluid motor operating means 37 to the breaker structure, and a push rod 50 for transmitting the energy of the fluid motor to the breaker closing solenoid mechanism 18 shown in Fig. 1. A flexible high pressure hose 101 connects the power unit 36 to the fluid motor operating means 37 and thereby provides control of the closing device 35 remote from the circuit breaker. Device 35 may be equipped with wheels and a handle (not shown) for easy portability, thus providing for convenience in storage and handling.

More particularly the accumulator 38 comprises a homogeneous, seamless, high pressure shell 54, cylindrical in shape and spun semispherical at either end. One end has an opening for a gas valve 55 which is molded to a pear shaped synthetic rubber bladder 56. The other end of accumulator 38 has an opening 57 provided with a plug assembly. Incorporated in the plug assembly is a poppet valve 59 which seals off opening 57 when the oil is completely expelled from shell 54. This action prevents the bladder 56 from extruding through the opening 57.

The accumulator bladder 56 is precharged with dry nitrogen through the gas valve 55 to approximately two-thirds of the desired system operating pressure. With no oil in the accumulator, the bladder fills the entire interior of the accumulator shell 54. As oil is forced into the accumulator 38 from pump 39, it compresses the bladder 56 and the pressure rises in accordance with Boyle's Law. To insure proper operation throughout the temperature range encountered in circuit breaker applications, a commercial oil having a nearly flat viscosity curve is chosen as the operating medium. Accumulator 38 is connected through a section of pipe 61, fitting 42 and filter 45 containing a replaceable filter element to pump 39.

Pump 39 is a hand operated device containing a built-in reservoir 62. Its function is to supply oil under pressure to the accumulator.

The control or trigger valve 40 is connected in the pipe system between the accumulator 38 and the fluid motor operating means 37 for controlling the passage of fluid from the source to the fluid motor operating means 37. Valve 40 is a noncritical control valve which functions to provide built-in safety features and pressure interlocks. This valve prevents the fluid from being used to start to close the breaker until sufficient quantity of fluid under pressure is available in accumulator 38 to complete the closing operation. Valve 40 further holds the stored energy in check until it is released at the election of the operator.

Valve 40 comprises a valve casing or cylinder 65 providing an inlet port 66, an outlet port 67 and an exhaust port 68, a first valve for controlling the inlet port 66 comprising a valve seat 69 and a ball type valve element 70 cooperating with valve seat 69 to form a valve unit, a second valve for controlling the exhaust port 68 comprising a valve seat 71 and a ball type valve element 72 cooperating with valve seat 71 to form a second valve unit, a piston type element 73 reciprocably mounted in casing or cylinder 65, resilient means comprising springs 74 and 75 for biasing the piston type element 73 in one direction to actuate valve element to valve open position, and a manual means comprising a pivotally mounted handle 76 mounted on cylinder 65 for reducing the effect of the biasing means for causing the source of fluid to crack the first valve and actuate the piston type element 73 against the action of the springs 74 and 75.

Spring 74 of the biasing means is arranged between washers 77 seated on piston type element 73 and a cover plate 78 of cylinder 65. Spring 75 of the biasing means is mounted inside of spring 74 around a release rod 79, between cover plate 78 and a shoulder 80 secured to one end of rod 79. The other end of rod 79 extends through cover plate 78 and is provided with check nuts 81. Spring 75 biases release rod 79 against piston type element 73. Handle 76 is provided with a nose member 82 which engages check nuts 81 to actuate release rod 79 against the biasing action of spring 75 upon counterclockwise rotation of handle 76.

The piston type element 73 is provided with a piston rod or plunger 83 which extends axially through the valve seat 71 and into engagement with ball type valve element 72. Valve seats 69 and 71 are axially aligned along the longitudinal axis of cylinder 65. Ball type valve element 72 when actuated to valve open position under the influence of piston rod 83 and its biasing means engages and actuates ball type valve element 70 against valve seat 69 to valve closed position. Spring 74 is designed to exert sufficient force when acting alone, to prevent ball type valve element 70 from rising from its valve seat 69 until pressure in pipe lines 61 is increased to or is above the minimum safe operating pressure for the circuit breaker shown or for all circuit breakers which are to be operated by this closing device 35. Spring 75 is designed for providing sufficient force so that when acting with spring 74 it can prevent ball type valve element 70 from rising off its valve seat 69 even at pressures far above the maximum safe operating pressure.

The relief valve 43 comprising valve casing 85 providing an inlet port 86 and an outlet port 87 and a valve seat 88 cooperating with a spring biased ball element 89 opens to bypass oil from the high pressure pipe 61 connecting the pump 39 and accumulator 38 to a low pressure pipe 90 connecting the exhaust port 68 of valve 40 and the reservoir 62 of pump 39. When the maximum safe operating pressure is reached in the high pressure pipe 61 and in accumulator 38 relief valve 43 bypasses fluid under pressure from the output side of pump 39, to its reservoir 62 so that it is impossible for an operator to increase pressure by continued hand pumping.

Check valve 44 comprising a valve casing 95 and a spring biased valve element 96 is connected at one end thereof to an exhaust port 97 in casing 65 of valve 40 and at the other end thereof to a pipe 98. Pipe 98 is connected to a base member 99 forming an integral part of the valve casing 65 of valve 40 which forms a part of the high pressure pipe 61 connected to inlet port 66. Valve 44 plays no direct part during the circuit breaker closing operation, however, after the breaker is closed the check valve 44 permits a quick return of the oil in the pipe to the reservoir 62 of pump 39.

The breaker operating cylinder 37 is connected to the outlet port 67 of valve 40 through a self-sealing coupler 100 and pipe 101. The coupler 100 comprises a spring loaded poppet valve 102. A spring loaded annular sleeve 103 slides on a tubular valve 104 which is immovably fixed to the coupling housing 105. Poppet valve 102 is firmly held against its seat by spring pressure, and sleeve 103 employing a replaceable sealing means 106 is held firmly against the face of the tubular valve 104 by spring and fluid pressure. An O ring packing 107 provides a seal between the sleeve 103 and the housing 105. When the coupler 100 is coupled to the housing of the fluid motor operating means 37, the sleeve 103 and tubular valve 104 contact the face of the poppet valve expelling all air. Tightening the union nut 108 forming a part of the housing moves the annular valve sleeve and poppet valve together to open the fluid passage.

When an operator desires to close the circuit breaker with the manual closing device 35 properly affixed to the circuit breaker structure, he rotates the handle 112 clockwise to close pump bypass valve 113 and then operates handle 115 with up and down motion until the indicator reading of the pressure gauge 41 becomes constant. The manual closing device is then ready for a breaker closing operation. Rotation of handle 76 counterclockwise triggers valve 40 by lifting rod 79 and shoulder 80 off of piston type element 73 to compress spring 75. When the reaction of spring 75 is removed from piston type element 73 the only remaining force on element 73 and ball type elements 70 and 72 is the biasing effect of spring 74. The oil pressure within the pipe 61 and accumulator 38 being within the safe operating range overcomes the reaction of spring 74 and lifts ball type element 70 from its valve seat 69. When ball type element 70 moves upward by the fluid pressure acting on its pressure responsive surface, it exposes the larger surface of ball type element 72 which is forced upward by the pressure to engage its valve seat 71 and form a pressure tight seal so that fluid under pressure in valve 40 cannot be lost through the exhaust port 68. Once the valve formed by valve seat 69 and ball type element 70 has been cracked, the circuit breaker closing operation will go to completion regardless of how briefly the release lever or handle 76 holds the force of spring 75 off of piston type element 73.

Partial operations or jogging are not possible. This is due to the difference in areas upon which the fluid pressure acts before and after unseating ball type element 70. Before unseating of element 70 the fluid under pressure acts on substantially .707 times the diametrical area of element 70 while after unseating element 70 the fluid under pressure acts on the full diametrical area of the larger ball type element 72. This increase in force is sufficient to hold the valve formed by valve seat 69 and element 70 open against the combined reaction of springs 74 and 75. The fluid under pressure flowing through inlet port 66 also acts on piston type element 73 to force element 73 upward against the reaction of springs 74 and 75 to aid in quickly opening inlet port 66 and closing exhaust port 68 with ball type element 72. The cross sectional area of port 68 is relatively small. Therefore, the volume of fluid under pressure passing through pipe 90 is of a limited quantity during piston operation. In other words, during any valve operation, the fluid passing into the cylinder below piston 73 is of sufficient pressure and volume that it can readily operate piston 73 even though a part of it may be bled through lines 68-90 to the reservoir. Fluid under pressure in cylinder 65 passes through outlet port 67, pipe 101, coupler 100 to operating cylinder 37 to actuate piston 47 of cylinder 37 against the biasing effect of spring 48 thereby actuating a push rod 110 and a lever arm 111 and solenoid 18 to close the circuit breaker contacts 11 and 12.

To return piston 47 of the fluid motor operating means 37 to the position shown, after the circuit breaker has closed the operator rotates a valve handle 112 counterclockwise which opens a pump check valve 113 to provide a means for emptying back into the pump reservoir 62 the remaining fluid stored in the accumulator 38. When pressure in the header or base member 99 falls below that in the fluid motor operating means 37 check valve 44 opens to reduce the fluid pressure in pipe 101 causing spring 48 to force piston 47 from left to right in cylinder 46, thereby forcing the fluid in cylinder 46 back through coupler 100 into pipe 101. The consequent displacement of fluid in the pipe 101 is communicated by valve housing 65, check valve 44, base member 99, fitting 42 and filter 45 to pump reservoir 62. Device 35 is then fully reset and ready for another accumulator charging operation.

The quick coupler 100 is so designed that the hose or pipe 101 may be quickly disconnected from fluid motor means 37 without loss of fluid from pipe 101 and may be quickly reconnected to other fluid motor operating means designed for operating other types of circuit breaker structures.

An orifice 114 at the entrance of the fluid motor operating means 37 is of such a diameter with respect to the diameter of piston 47 that $$p_f + p_o = P$$

where $p_f$ = fluid pressure on piston 47 required to close the circuit breaker at maximum safe closing speed.
$p_o$ = pressure drop through orifice 114.
$P$ = source pressure.

Such a fluid motor operating means, having an orifice proportioned in accordance with the foregoing equation for a particular circuit breaker, is not limited in its application to that circuit breaker alone, for the following reasons.

For the fluid motor operating means of this invention, in which the entire hydraulic system lies in a substantially horizontal plane and therefore has a $gh$ ($g$ is gravitational acceleration and $h$ is velocity head) component equal to zero and in which the viscosity $p$ of the fluid is constant, Bernoulli's fundamental equation may be written $$p_o = KV^2$$

where $p_o$ = pressure drop through orifice 114.
$K$ = a constant.
$V$ = closing velocity of piston 47 = closing speed of the circuit breaker mechanism.

Thus, when the fluid motor operating means is required to close a circuit breaker having a greater closing force demand than that of the circuit breaker for which the orifice was originally designed, the consequent reduction in the velocity of its piston causes an exponential reduction of the pressure drop through its orifice, thereby releasing the additional force necessary to close the circuit breaker.

In the event that a system fault occurs during the circuit breaker closing operation and the magnitude of the ensuing fault current is such as to electromagnetically retard full engagement of the circuit breaker contacts, consequent reduction in the closing velocity of piston 47 will, likewise, release the additional force necessary to fully close the contacts of the circuit breaker.

Therefore, such a fluid motor operating means can be safely applied to circuit breakers having closing speeds and closing force demands which differ widely from those of the circuit breaker for which its orifice was originally designed, provided that in each case the total kinetic energy demand is substantially the same as that of the original breaker.

For circuit breakers having kinetic energy demands substantially greater than that of the original breaker, orifices of correspondingly greater diameter are required, the limiting condition being that imposed by a circuit breaker whose kinetic energy demand is substantially equal to the total potential energy stored in the accumulator.

Although but one embodiment of the present invention has been illustrated and described, it will be apparent to those skilled in the art that various changes and modifications may be made therein without departing from the spirit of the invention or from the scope of the appended claims.

It is claimed and desired to secure by Letters Patent:

1. In an operating mechanism for circuit breakers, a motor operable by fluid under pressure and comprising a cylinder and a piston movably arranged therein, a source of fluid under pressure, means for admitting fluid under pressure from said source to said cylinder to actuate said breaker in contact closing direction, said means comprising a valve casing providing an inlet port, an outlet port and an exhaust port, a first valve for controlling said inlet port, said first valve comprising a first valve seat and a first ball type valve element cooperating with said first valve seat, a second valve for controlling said exhaust port, said second valve comprising a second valve seat and a second ball type valve element cooperating with said second valve seat, a piston type element reciprocably mounted in said casing, resilient means for biasing said piston type element in one direction to actuate said second valve element to valve open position, said second valve element upon movement to valve open position engaging and actuating said first valve element to valve closed position, means defining a passage from said source to said cylinder, said casing forming an integral part of said passage, a pressure responsive surface provided on said first valve element upon which the pressure in said passage acts to actuate said first valve element to valve open position against the action of said biasing means to connect said inlet port to said outlet port, a pressure responsive surface provided on said piston type element upon which the pressure in said casing acts to actuate said piston type element against the action of said biasing means, said second valve element being actuated to valve closed position to close said exhaust port only upon cracking of said first valve element and movement of said piston type element against the action of said biasing means, means for controlling the pressure acting on said surface of said first valve element so that the pressure does not exceed a predetermined value, and means for reducing the effect of said biasing means for causing said source of fluid to crack said first valve and actuate said piston type element against the action of said biasing means.

2. In an operating mechanism for circuit breakers, a motor operable by fluid under pressure and comprising a cylinder and a piston movably arranged therein, a source of fluid under pressure, means for admitting fluid under pressure from said source to said cylinder to actuate said breaker in contact closing direction, said means comprising a valve casing providing an inlet port, an outlet port and an exhaust port, a first valve for controlling said inlet port, said first valve comprising a first valve seat and a first ball type valve element cooperating with said first valve seat, a second valve for controlling said exhaust port, said second valve comprising a second valve seat and a second ball type valve element cooperating with said second valve seat, a piston type element reciprocably mounted in said casing, resilient means comprising a first spring and a second spring for biasing said piston type element in one direction to lock said first valve element in valve closed position and said second valve element in valve open position, means defining a passage from said source to said cylinder, said casing forming an integral part of said passage, a pressure responsive surface provided on said first valve element upon which the pressure in said passage acts to actuate said first valve element to valve open position against the action of said biasing means to connect said inlet port to said outlet port, said second valve element being actuated to valve closed position to close said exhaust port only upon cracking of said first valve element, and means for controlling the pressure acting on said surface of said first valve element so that the pressure does not exceed a predetermined value, and means for removing the biasing effect of said second spring from said piston type element for causing said source of fluid to crack said first valve, actuate said piston type element against the biasing action of said first spring and close said second valve.

3. In an operating mechanism for circuit breakers, a motor operable by fluid under pressure and comprising a cylinder and a piston movably arranged therein, a source of fluid under pressure, means for admitting fluid under pressure from said source to said cylinder to actuate said breaker in contact closing direction, said means comprising a valve casing providing an inlet port, an outlet port and an exhaust port, a first valve for controlling said inlet port, said first valve comprising a first valve seat and a first ball type valve element cooperating with said first valve seat, a second valve for controlling said exhaust port, said second valve comprising a second valve seat and a second ball type valve element cooperating with said second valve seat, a piston type element reciprocably mounted in said casing, resilient means comprising a first spring and a second spring for biasing said piston type element in one direction to actuate said second valve element to valve open position, said second valve element upon movement to valve open position engaging and actuating said first valve element to valve closed position, means defining a passage from said source to said cylinder, said casing forming an integral part of said passage, a pressure responsive surface provided on said first valve element upon which the pressure in said passage acts to actuate said first valve element to valve open position against the action of said biasing means to connect said inlet port to said outlet port, a pressure responsive surface provided on said piston type element upon which the pressure in said casing acts to actuate said piston type element against the action of said biasing means, said second valve element being actuated to valve closed position to close said exhaust port only upon cracking of said first valve element and movement of said piston type element against the action of said biasing means, and means for controlling the pressure acting on said surface of said first valve element so that the pressure does not exceed a predetermined value, and means for removing the biasing effect of said second spring from said piston type element for causing said source of fluid to crack said first valve and actuate said piston type element against the biasing action of said first spring and close said second valve.

4. In an operating mechanism for circuit breakers, a motor operable by fluid under pressure and comprising a cylinder and piston movably arranged therein, said cylinder providing an orifice for controlling the rate of flow of fluid into said cylinder, said orifice being of a predetermined size so that upon varying closing speeds and force demands of the different circuit breakers said orifice causes a change in the pressure drop through said orifice thereby releasing substantially the force needed to close each of the circuit breakers at its predetermined speed, a source of fluid under pressure, means for admitting fluid under pressure from said source through said orifice to said cylinder to actuate said breaker in contact closing direction, said means comprising a valve casing providing an inlet port, an outlet port and an exhaust port, a second valve element for controlling said exhaust port, a piston type element movably arranged in said casing, resilient means for biasing said piston type element in one direction to lock said first valve element in valve closed position and said second valve element in valve open position, means defining a passage from said source to said cylinder, said casing forming an integral part of said passage, a pressure responsive surface provided on said first valve element upon which the pressure in said passage acts to actuate said first valve element to valve open position against the action of said biasing means to connect said inlet port to said outlet port, said second valve element being actuated to valve closed position to close said exhaust port only upon cracking of said first valve element, and means for controlling the pressure acting on said surface of said first valve element so that the pressure does not exceed a predetermined value.

References Cited in the file of this patent

UNITED STATES PATENTS

| | | |
|---|---|---|
| 768,939 | Hall | Aug. 30, 1904 |
| 1,138,278 | Castle | May 4, 1915 |
| 1,808,431 | Osborne | June 2, 1931 |
| 1,955,154 | Temple | Apr. 17, 1934 |
| 2,347,379 | Teeter | Apr. 25, 1944 |
| 2,437,991 | Baston | Mar. 16, 1948 |
| 2,446,691 | Clyde et al. | Aug. 10, 1948 |
| 2,526,406 | Pfauser | Oct. 17, 1950 |
| 2,619,523 | Bonine et al. | Nov. 25, 1952 |
| 2,660,984 | Zumwalt | Dec. 1, 1953 |
| 2,662,134 | Umphrey | Dec. 8, 1953 |